Figure 1:
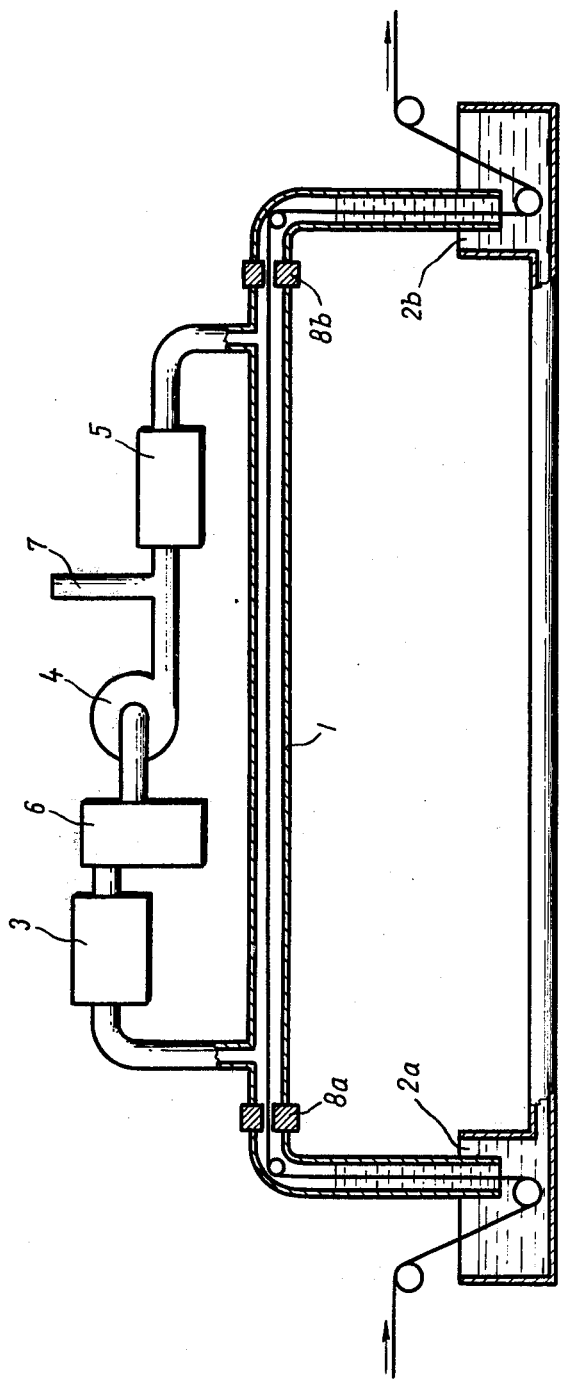

United States Patent [19]

Stoy et al.

[11] 4,173,606

[45] Nov. 6, 1979

[54] METHOD OF MANUFACTURING SHAPED ARTICLES FROM CRYSTALLINE ACRYLONITRILE POLYMERS AND COPOLYMERS

[75] Inventors: Vladimír Stoy; Artur Stoy; Jiří Zíma; Jaroslav Kálal, all of Prague, Czechoslovakia

[73] Assignee: Ceskoslovenska akademie ved., Prague, Czechoslovakia

[21] Appl. No.: 895,366

[22] Filed: Apr. 11, 1978

Related U.S. Application Data

[63] Continuation of Ser. No. 702,573, Jul. 6, 1976, abandoned.

[30] Foreign Application Priority Data

Jul. 14, 1975 [CS] Czechoslovakia ............... 4957/75

[51] Int. Cl.$^2$ .................. B29D 11/00; B29C 25/00
[52] U.S. Cl. ........................... 264/1; 3/1; 3/1.5; 210/500 M; 260/29.6 AN; 264/182; 264/206; 264/233; 264/237; 351/160 H; 528/481; 528/486; 528/487; 528/488; 528/491; 528/492; 528/494; 528/495; 528/496; 528/497; 528/498; 528/499
[58] Field of Search ............... 264/1, 233, 237, 182, 264/206; 528/481, 486, 487, 488, 491, 492, 494, 495, 496, 497, 498, 499; 260/29.6 AN

[56] References Cited

U.S. PATENT DOCUMENTS

| | | | |
|---|---|---|---|
| 2,356,896 | 8/1944 | Smith | 260/73 |
| 2,558,730 | 7/1951 | Cresswell | 18/54 |
| 2,968,558 | 1/1961 | Clavier et al. | 96/114 |
| 3,948,870 | 4/1976 | Stoy et al. | 260/85.5 R |

*Primary Examiner*—Stanford M. Levin

[57] ABSTRACT

The invention relates to a method of manufacturing shaped articles from crystalline or quasi-crystalline acrylonitrile polymers and copolymers, said method consisting in cooling down a solution of said polymer or copolymer in a mixture containing from 50 to 99.5% by weight of a solvent and from 0.5 to 50% by weight of a precipitant to a temperature below the gelation point of the solution until the same gelatinizes, without changing its composition, to the desired shape, whereafter the solvent is removed from the shaped thermoreversible gel thus obtained at temperatures lower than the gelation point of the solution, preferably using a liquid precipitant of polyacrylonitrile miscible with the solvent. It is advantageous to remove the solvent at a temperature which is at least 10° C. lower than the gelation temperature of the polymer solution used. The shaping can be carried out in any convenient way, e.g. using a stationary or rotating mold. Beads, spheres, filaments and foils can be shaped without any mold in the usual way. The method is also suitable for coating surfaces.

4 Claims, 4 Drawing Figures

METHOD OF MANUFACTURING SHAPED ARTICLES FROM CRYSTALLINE ACRYLONITRILE POLYMERS AND COPOLYMERS

This a continuation application of Ser. No. 702,573, filed July 6, 1976, now abandoned.

BACKGROUND OF THE INVENTION

"Thermoreversible gel" is a gel crosslinked by bonds of the physical type, capable of being transformed by heating within a comparatively narrow range of temperatures to a sol, i.e. a solution of the polymer. Upon cooling below the temperature of gelation, the liquid sol solidifies again to gel.

As solvents there are used liquids capable of dissolving polyacrylonitrile and its copolymers, either alone or blended to form a co-solvent mixture. Examples are dimethyl formamide, dimethyl sulfoxide, cyclic ethylene carbonate, nitric acid, sufficiently concentrated aqueous solutions of sodium or calcium rhodanide or of zinc chloride. In the case of copolymers, particularly so called multiblock-copolymers, the solvent must be capable of dissolving also the other component, i.e. not only polyacrylonitrile, but also e.g. polyacrylamide forming the sequences alternating with polyacrylonitrile.

Acrylonitrile polymers or copolymers useful in the present process are preferably those displaying in the absence of solvents of polyacrylonitrile the typical X-ray pattern with a 5.1 Å periodicity, the reflexes appearing in equatorial position upon stretching the sample. The crystallograhic structure of polyacrylonitrile is described e.g. in the paper of C. K. Bohn, J. R. Schaefgen and W. O. Statton in J. Polymer Sci. 55, 531 (1961). The structural features of polyacrylonitrile remain preserved in copolymers—so called block copolymers—containing sufficiently long sequences of acrylonitrile units. Random copolymers, however, have to contain at least 70% of acrylonitrile units to show the said typical X-ray pattern, while multi-block copolymers display it even if they contain but 1% of acrylonitrile units, due to the sequences in which the units are arranged.

A typical feature of such multi-block copolymers is their solubility in solvents capable of dissolving polyacrylonitrile, or in solvent mixtures containing such solvents. Even the above mentioned multi-block copolymers containing a very low proportion of acrylonitrile units, arranged, however, in more or less long sequences, are soluble only in solvents which are typical solvents of pure polyacrylonitrile, e.g. dimethyl sulfoxide. Other known solvents of polyacrylonitrile which can be used here are: Dimethyl acetamide, dimethyl methoxyacetamide, N-formyl morpholine, N-formyl hexamethylene imine, cyclic tetramethylene sulfone, 1,2,3-trithiocyano propane, gamma-thiocyanobutyronitrile, some cyclic lactones and lactams, carboxylic acids such as formic and halogenacetic acids, nitric acid with a concentration higher than 40%, 70–85% sulfuric acid, hydrofluoric acid, highly concentrated phosphoric acid, concentrated aqueous solutions of alkali metal perchlorates or of lithium bromide, and other solvents mentioned above. The list is not complete and the solvents are mentioned by way of example only, other solvents of polyacrylonitrile being not excluded.

The precipitants are such as to be incapable of dissolving polyacrylonitrile. They can be, however, solvents or swelling agents for the other component or components of the copolymer. Typical precipitants, miscible with the said solvents, are water, lower aliphatic alcohols, glycerol, ethylene glycol, polyethylene glycols such as di(ethyleneglycol), monoethers and monoesters of aliphatic glycols, and many others. For the most important multi-block copolymers of acrylonitrile with acrylamide or with acrylic acid, respectively, water is not only the cheapest but also the best precipitant in many respects, particularly if the shaped articles are designed for use in surgery.

In the case of solvents consisting of more than one component such as inorganic aqueous acids or aqueous salt solutions, the solution with the minimum concentration capable of dissolving polyacrylonitrile is considered the solvent, the surplus of water, if present, being the precipitant. The minimum concentration is either known or can be easily determined. It depends on the molecular weight and temperature.

PRIOR ART

It is known that concentrated solutions of polyacrylonitrile, particularly in mixtures of solvents and precipitants, can form thermoreversible gels upon cooling. This property is now established also in the case of multi-block copolymers of acrylonitrile with acrylamide and/or acrylic acid. The ability of forming thermoreversible gels was undesired in the case of polyacrylonitrile solutions, since it caused troubles in the transport and storage as well as in the determination of the rheological properties.

It is found now that thermoreversible gelation of solutions of acrylonitrile polymers and copolymers in mixtures of solvents and precipitants can be used for working said polymers by methods which were not useable hitherto and thus for manufacturing articles which could be prepared from said polymers and copolymers either with great difficulties or not at all. The non-plasticized crystalline acrylonitrile polymers and copolymers cannot be melted without decomposition and the pressure-molding of them at elevated temperatures like the usual thermoplastics was possible only in exceptional cases. Thus, the only industrial method of manufacturing articles from said polymers was either "dry" or "wet" working of their solutions, mostly for the production of fibers, foils or coatings.

The "dry" method, consisting in evaporating the solvent, leads to hard, brittle articles which cannot be used without either stretching or plasticizing. Since all solvents of polyacrylonitrile are high-boiling liquids, the evaporation takes a comparatively long time so that the "dry" working is suitable only for thin articles such as fibers or foils. Moreover, acrylonitrile polymers shrink abruptly when the solvent concentration sinks below a certain value. Then the polymer chains come close together so that strong cohesion forces can suddenly form intermolecular bonds, the remaining portion of the solvent being thereby expelled or squeezed out to the surface. As a result, if a thick layer of the solution is dried, a strongly contracting "skin" is formed, covering a core of the still fluid solution. Thereby the shape gets deformed and the surface wrinkled. This is the case particularly when the evaporation is accelerated by using decreased pressure so that the concentration gradient of the solvent is high.

Similar troubles occur also in "wet" working of said solutions, where the solvent is extracted and washed out by means of a precipitant. During a rapid coagulation, a film of coagulated polymer is formed on the surface, acting as a semipermeable membrane. Osmotic pressure causes the formation of small voids behind the membrance, which voids burst gradually and are formed again as the coagulation proceeds towards the interior of the article. The resulting coagulate is an incoherent, brittle mass with a porosity of up to 90%. Therefore the coagulation has to be slowed down to reduce the local concentration gradient to a minimum. Then, a homogeneous layer of a highly swelled polymer is formed instead of a semipermeable membrane, and the solvent as well as the precipitant can diffuse easily through said layer. The highly swelled layer contracts strongly, however, when deswelled, and if the article is not thin enough to leave no fluid solution inside, or if the cross section of the article is not circular (e.g. a fiber or a tube), the article gets deformed and its surface becomes wrinkled. The surface can be also unfavorably affected by cosolvent effects, causing first swelling and then deswelling of the surface layer, e.g. in the case of block-copolymers of acrylonitrile which otherwise coagulate smoothly and uniformly. It is evident that the possibilities of working crystalline acrylonitrile polymers and block-copolymers were practically restricted to the usual fiber and foil manufacture.

DESCRIPTION OF THE INVENTION

The invention is based on the finding that the removal of the solvent takes place without any deformation of the shape if the solutions of acrylonitrile polymers and copolymers in a mixture of solvent and non-solvent are first transformed to a termoreversible gel having the desired shape, whereafter the solvent is either washed out or evaporated at temperatures lying below the gelation temperature. By removing the solvent the intermediate thermoreversible gel is transformed to a geometrically similar article the size of which depends on the swelling ability of the precipitant with regard to the polymer. If the polymer does not swell in the precipitant, the size of the end product is decreased in accordance with the polymer concentration in the gel, and the article is hard. If the polymer swells strongly in the precipitant, the size of the end product can be even larger that that of the originally shaped thermoreversible gel. Thus, various products ranging from hard xerogels to highly swollen lyogels or hydrogels can be obtained.

As mentioned above, the temperature during the removal of the solvent has to be lower than that of the gelation, preferably by 5°–20° C., preferably by at least 10° C. in order to avoid converting any part of the thermoreversible gel to a sol. At temperatures sufficiently low, the thermoreversible gel is elastic and not easily deformable. As the gelation point steeply increases with decreasing concentration of the solvent, it is possible to increase the temperature in the course of the solvent removal and thus to accelerate the process gradually. Never must the gel be transformed to a sol even for a moment.

The solvent for the polyacrylonitrile can be removed either by evaporation or by extraction with a precipitant (non-solvent). In the first case, the solvent should have higher a vapour pressure than that of the non-solvent present, and the evaporation can be accelerated by using reduced pressure. In most cases, the extraction with a precipitant, miscible with the solvent, is preferred.

The evaporation of the solvent from the thermoreversible gel is often accompanied by "perspiration" of the last portions of the solvent due to sudden formation of intermolecular bonds. In contradistinction to the known working of polymer solutions, this perspiration causes no deformation.

PREFERRED EMBODIMENTS

In the case of acrylonitrile copolymers, the precipitant can be chosen so as to precipitate either the two components simultaneously, or to precipitate just the polyacrylonitrile segments of macromolecules, while the other component—e.g. polyacrylamide—is swelled (solvated). In the case of acrylonitrile-acrylamide block-copolymers both components are precipitated e.g. by lower aliphatic alcohols, forming a hard xerogel. If water is used as the precipitant of the polyacrylonitrile component but as a solvent for the polyacrylamide component, elastic, homogeneous, strong hydrogels are obtained, having the original shape of the thermoreversible gel. The size can be equal or larger or smaller than that of the thermoreversible gel prior to washing it in water, depending on the swelling capacity in water and the polymer concentration in the thermoreversible gel.

As precipitants or non-solvents of polyacrylonitrile, many liquids can be used in addition to those mentioned above: Aliphatic alcohols $C_1$ to $C_{20}$, alkylene glycols $C_2$ to $C_6$ and their ethers or esters with carboxylic acids, acyl derivatives of glycerol, dialkyl ethers, cyclic ethers such as dioxane or furan, aldehydes and ketones such as acetone or cyclohexanone, free organic acids $C_2$–$C_{24}$, their esters, amides and imides, lactams and lactones, aromatic hydrocarbons such as toluene, benzene and xylenes, their hydroxy derivatives such as benzyl alcohol, cyclohexanol and phenols, as well as many other organic liquids miscible with the solvent of polyacrylonitrile used, but not dissolving it themselves, either alone or in mixtures. Among inorganic liquids, aqueous solutions of many salts unable to dissolve polyacrylonitrile can be used such as alkali metal sulfates, chlorides, nitrates or phosphates.

In some instances, it can be advantageous to slow down the coagulation of the thermoreversible gel at the beginning by adding a minor amount of a solvent of polyacrylonitrile to the precipitating or coagulating non-solvent to increase the quality and homogeneity of the product. The same effect can be achieved by treating the thermoreversible gel gradually with small amounts of the precipitant, not exceeding 10 volumes of the gel, and by adding further precipitant or its mixture with a minor amount of the solvent only after reaching the concentration equilibrium in the gel and the surrounding liquid. This method makes it possible to obtain large, massive objects at a high average volume concentration of the solvent.

The method of the invention makes it possible to work crystalline acrylonitrile polymers and copolymers in various ways not possible hitherto. It is possible, for instance, to cast the solutions in open molds, on horizontal surfaces or pads or on the surface of specifically heavier liquids immiscible with the solutions to transform them to reversible gels by cooling and then to form the desired geometrically similar articles by removing the solvent below the temperature of gelation. The casting in the sol form is far less sensitive to various factors than the known polymerization casting and can be performed not only in stationary molds, but also in rotating vessels or molds for manufacturing soft contact lenses and other exacting, accurately shaped articles such as prostheses of joints and heart valves, prostheses of tendons or sinews from hydrophilic multiblock- copolymerws of acrylonitrile with acrylamide, various commodities and machine details such as sealing gaskets and other articles where the outstanding toughness, abrasion resistance as well as thermal and chemical stability of acrylonitrile polymers and copolymers can be made use of.

Solutions of crystalline acrylonitrile polymers anc copolymers in solvent/non-solvent mixtures in the sol form can be also used for coating surfaces with smooth hydrogel layers. Another technique is dipping a hollow, preferably internally cooled immersion tool into the said mixture in the form of a sol. The gel layer, the thickness of which depends on the temperature of the sol and that of the immersion mold, on the time of dipping and on the heat capacity of the dipping form, is then deprived of the solvent by removing it at temperatures below the gelation point. In this way it it possible to manufacture e.g. catheters, tubes designed to be introduced into the cavities of living bodies, wrappers, bags, filters and similar items from hydrophilic acrylonitrile crystalline polymers and copolymers. Special coatings from such hydrophilic gels can be used to improve dyeing ability or wettability, to achieve resistance against corrosion and solvents. The contraction taking place during the drying provides for good adhesion of the coating even in the case of insufficient primary adhesion. The contraction causes simultaneously biaxial orientation of the film.

The method of the invention can be used also for coating ship hulls under the water line with a smooth hydrogel layer reducing the hydrodynamic resistance of the ship. The coating can consist of several layers, some of them containing anticorrosive and/or pesticide substances, e.g. copper oxides and other means inhibiting the growth of sea plants and animals on the coating. Individual layers can differ also in swelling capacity, increasing gradually from the hull surface to the water boundary, in order to ensure both fast adhesion and low hydrodynamic drag. A suitable primer such as an epoxide resin can be applied if desired, preferably in mixture with an acrylonitrile polymer or copolymer in a common solvent such as dimethyl formamide. To improve the bonding, it is possible to apply the first layer of the thermoreversible gel prior to the finished hardening of the epoxide resin. The unusual strength and elasticity of multi-block hydrophilic copolymers of acrylonitrile provide for very effective and long lasting coatings of this kind.

The method of the invention can be used also for making filamentary articles such as fibers, hollow filaments, non-woven textile products and similar items. By spinning, extruding or drawing fibers from a sol which gelates by cooling just after having left the nozzle and by removing the solvent by extracting or evaporating it at temperatures below the gelation point, it is possible to prepare extraordinarily fine fibers, up to 100 times finer than when spinning the usual solutions or melts. The drawing off velocity can be simultaneously increased in comparison with the usual wet spinning. Such advantages are probably due to the fact that the gelatinized, not yet coagulated streams of spinning solution are much more resistant to the applied drag than the usual liquid spinning streams. This property makes itself felt particularly if a gas-filled space is arranged between the spinning nozzle and the precipitating or coagulating bath, so that the thin streams of the spinning solution are further stretched while gelatinizing prior to coming in contact with the bath, the temperature of which lies below the gelation point of the spinning solution. In other words, the rheological properties of the spinning solution in the spinning nozzle and at the point of the minimum diameter are substantially different. The same holds for surface tension. During the drawing off, the gelated stream is not torn at such a decreased diameter as that at which the liquid stream is already interrupted. The low viscosity of the spinning solution in the nozzle makes possible very high spinning velocities.

In contrast to the usual spinning solutions which cannot be oriented by stretching in an air gap between the nozzle and the coagulation bath, thin gelatinized streams can be effectively oriented if dragged along with a rapidly streaming gaseous or liquid medium. The spinning solution, kept just above the gelation temperature, can be spun through an air gap where it gelates prior to contacting the rapidly streaming precipitation or coagulation bath. Molecular orientation takes place mainly prior to coagulation of the polymer or also during the coagulation, the filament being under tension during its passage through the precipitation bath. In this way, very thin microfibers with a diameter ranging from several thousandths to several hundredths of a millimeter can be obtained, and are suitable as fillers, filter materials, insulation materials, webs for non-woven textile and artificial leather and similar items.

The method of the invention makes it also possible to extrude tubes of small diameter, including very fine hollow filaments and fibers. Solutions above the gelation temperature are extruded through a circular nozzle provided with an axial inlet. A suitable cooling fluid, which can, if desired, act simultaneously as a precipitant, is fed through said axial inlet. Said fluid may be a gas, a vapor, a liquid or a mixture thereof. Since the extruded sol solidifies by cooling prior to the coagulation (i.e. prior to the extraction or evaporation of the solvent), the inner walls of the tube or hollow fiber do not stick together, in contrast to the situation with hollow fibers from the usual polymer solutions. Fiber, with an outer diameter of 0.1 mm or less and with a wall thickness of 0.02 mm can be obtained. Moreover, the holes or jets of the spinning nozzle can be placed close to each other. The above mentioned method of spinning through an air gap with the coagulating bath moving at a high rate can be used also for manufacturing hollow fibers with a high degree of orientation.

Thin tubes and hollow fibers can be utilized e.g. for dialysis, sorption, ion exchange. They can be cut to short, hollow cylinders of the type of Raschig rings.

The present method can be also used for manufacturing beads or spherical particles in such a way that a solution of crystalline acrylonitrile polymer or copolymer is dispersed, at temperatures above the gelation point, in a fluid medium, whereafter the droplets are solidified to gel form by cooling below the gelation temperature. The solvent is then removed either by extraction or evaporation, or by a combination of both of them. So it is possible to disperse the polymer solution (sol) in hydrocarbon or silicone oil while stirring, and to cool down the dispersion until the droplets gelate and are no longer sticky. The beads thus obtained can be separated by sedimentation or filtration and the solvent such as dimethyl formamide removed either by evaporating under reduced pressure at temperatures below the gelation point, or by extraction with a precipitant such as ethyl alcohol. Another possibility is to disperse the sol into a heated gas, to cool the dispersion as a fluidized bed and, if desired, to evaporate the solvent in vacuo from the fluidized beads. The product can be used as filter, as molecular sieve and similar item.

The sol of the acrylonitrile containing polymer can be mixed, prior to dispersing it in a fluid medium, with suitable additives such as dyestuffs, fillers, pigments, sorbents, antioxidants, biologically active substances etc., preferably those that are not soluble in the precipitant or can form therewith insoluble compounds. Such combinations are not an object of the invention and are mentioned only to show the usefulness of the method, which makes possible the use of known acrylonitrile crystalline polymers and copolymers for manufacturing products having new shapes and new useful properties.

The term "crystalline acrylonitrile polymers and copolymers" means polymers and copolymers displaying in the absence of solvents the typical X-ray pattern of polyacrylonitrile as defined above, i.e. polyacrylonitrile, random copolymers containing at least 70% of acrylonitrile units, and block-copolymers, particularly the multi-block copolymers, obtained by controlled acid or alkaline homogeneous hydrolysis of polyacrylonitrile, as far as they show the typical polyacrylonitrile X-ray pattern.

Filaments and foils are kept stretched while the solvent is removed therefrom.

Articles with an intricate shape can be advantageously made by casting the sol in a mold which can be tightly closed and elastically compressed during the cooling in order to eliminate vacuum voids and bubbles. It is also possible to use the known technique of injection molding to prepare intermediates from the thermoreversible gel. For this purpose, a two-piece mold with at least one inlet can be used, the sol being introduced under pressure through said inlet during the cooling and solidification.

The invention is further explained by means of the following non-limitative Examples, wherein all parts and percentages are by weight, if not stated otherwise.

EXAMPLE 1

Polyacrylonitrile with average molecular weight of 112,000, prepared by usual precipitation polymerization in water, was dissolved in cyclic ethylene carbonate to form a 12% solution, and 8% of n-butyl acetate was added while stirring at 90° C. The solution was stirred at the same temperature for 1 hour, whereafter it was poured onto a horizontal glass plate. After the disappearance of bubbles the plate was cooled to 8° C. until the solution turned to a thermoreversible gel. The layer was then covered with a layer of an ethylene carbonate-n-butyl acetate mixture 2:1, and further n-butyl acetate was gradually added while stirring until the ratio was 1:2. The temperature was increased to 20° C. and the gel was washed with pure n-butyl acetate, rinsed in methanol and dried at room temperature under reduced pressure. A transparent plane parallel plate resistant against scratching was obtained.

If, however, the removal of the solvent was carried out in the same way except that the temperature was higher than the point of gelation, i.e. if the precipitant was brought in contact with the non-gelated viscous solution, the product was deeply wrinkled and distorted.

EXAMPLE 2

A terpolymer containing 92% of acrylonitrile, 6.5% of vinyl pyrrolidone and 1.5% of sodium ethylene sulfonate was prepared in the usual way by precipitation polymerization in water. After having been isolated and dried, the terpolymer was dissolved in dimethyl formamide to form a 14% solution; 4.8% of di-ethylene glycol was then added while stirring at 110° C. The solution was extruded through a nozzle into paraffin oil cooled to −5° C. The gel filament thus obtained was drawn off and led into the apparatus shown diagrammatically on the annexed drawing, FIG. 1. The apparatus consisted of a 4 m long, slightly inclined tube 1, provided on both ends by mercury closures 2a, 2b, 750 mm high. The adjoined recovery circuit contains a condenser 3, rotary pump 4, heater 5, separator of the condensate 6 and outlet to a vacuum pump 7. The ends of the tube 1 are provided with sealed bearings 8a, 8b. The filament was led in by means of a small float, borne by the rising mercury, the closure 2a being turned by 60° and 2b by 120°. The transported filament was partly dried at 50° to 70° C. under reduced pressure, and the filament was simultaneously stretched by about 100% of its original length. The filament, leaving the device, was subsequently washed in water at 80° C. under tension, whereby the stretching was finished. The product was an acrylic fiber which could be easily dyed.

EXAMPLE 3

Polyacrylonitrile from Example 1 was dissolved at −25° C. in 65% nitric acid to form a 6% solution. The temperature was then increased to 10° C. and the solution left standing at the same temperature for 150 hours. The viscous solution thus obtained was extruded in a thin stream into an excess of cold water and the filament thus obtained washed to neutrality. The intermediate was a multiblock copolymer containing 83.1 mol % of acrylonitrile, 6.85 ml % of acrylamide and 0.05 mol % of acrylic acid units. The copolymer contained, when swelled to equilibrium, 9% water and showed, by X-ray analysis, a reflex with 5.1 Å periodicity. In swelled condition, the polymer could be oriented by cold-drawing, whereby the X-ray reflex diminished to equatorial sickles. The water-swelled copolymer was dissolved in dimethyl sulfoxide to a solution containing 8.5% of dry substance. The water content was increased to 5.5%, yielding a thermoreversible gel foming a sol at 43°–45° C. The sol was then extruded at 70° C. through a nozzle with 6 spinning holes of 0.5 mm, arranged in a circle, into an air gap where the streams of the sol solidified to a thermoreversible gel. The gel filaments were drawn off by a rapid stream of cold water into an ejector. The washed and simultaneously stretched micro-filaments were caught on a screen in the form of a web.

EXAMPLE 4

25 volume percent of acrylonitrile, 0.2 weight % of ammonium persulfate and 0.1 weight % of urea mononitrate were dissolved in 75 volume % of 65% nitric acid. The solution was left standing under nitrogen for 72 hours at 15° C. and 470 hours at 8° C. The solution was then extruded into an excess of cold water where it coagulated to a highly swelled multiblock-copolymer containing 11 mol % acrylonitrile, 87 mol. % acrylamide, 1.3 mol % diacryl imide and 0.7 mol % acrylic acid units. X-ray analysis showed, besides the amorphous halo of the hydrophilic domains, the typical polyacrylonitrile reflex with 5.1 Å periodicity, proving that the non-hydrolyzed segments of macromolecular chains were arranged in crystalline (or quasi-crystalline) domains. The swelled gel was stirred at 110° C. into dimethyl sulfoxide while water together with a part of the dimethyl sulfoxide evaporated, until the solution contained 8.0% of polymer dry substance. The stirring at the same temperature was continued and 15% of glycerol was added dropwise. By cooling down to temperatures below 77°-85° C. an elastic thermoreversible gel was obtained. The sol was then metered into a rotating concave mold for making contact lenses. The mold had a sharp edge and the wetting of the whole surface of the mold was induced by touching the border of the solution with the point of a needle. The rotating mold was cooled down to 20° C.; the gelated lens in the mold was covered with a mixture of dimethyl sulfoxide and water 1:1 and after 20 minutes immersed into cold water. After washing off the solvent, a transparent, soft lens with 91% (weight) of water was obtained.

EXAMPLE 5

The thermoreversible gel from Example 4 was extruded as a sol through a circular nozzle with an axial inlet, through which air was introduced under a mild pressure, into cold isopropyl alcohol and thereafter passed into cold water, wherein the hollow filament (very thin tube) was completely washed. The filament was extruded at such a rate that the washing in the two baths took place under tension. The hollow filament from the highly swelled hydrogel could be used e.g. for dialysis.

EXAMPLE 6

Into the sol formed from the thermoreversible gel of Example 3 a hollow internally cooled form or mold was dipped. At the mold temperature of 0° C., a layer of solidified thermoreversible gel was formed on the surface. The solvent was washed out in cold water and the shaped product removed. Articles of various shape can be manufactured by this method, e.g. elastic hydrogel covers for reconstruction of joint heads, catheters, intubation tubes, dialyzation membranes etc. on both concave and convex dip molds of any shape and size. When the resulting article is made from an elastic hydrogel, the removal from the mold surface causes no difficulties. If the article is made from a non-elastic polymer such as polyacrylonitrile, it is advantageous to remove it prior to the final washing when the article is still elastic. Another possibility is to use elastic dip molds, e.g. from rubber, inflated with a cool fluid medium.

EXAMPLE 7

A steroid hormone was dispersed into the sol formed from the thermoreversible gel according to Example 4 in the ratio 7 parts of the hormone to 1 part of the copolymer (dry substance). The hormone dissolved partially in dimethyl sulfoxide. The mixture was sucked into a thin-walled polyethylene tube which was cooled down below the gelation temperature of the sol; the tube was then cut through longitudinally. The core of the hormone-filled thermoreversible gel was then washed in cool water until to the removal of the solvent was finished. A highly permeable implant, useful for controlled release of the hormone into a living organism, was obtained.

EXAMPLE 8

Figure 2:
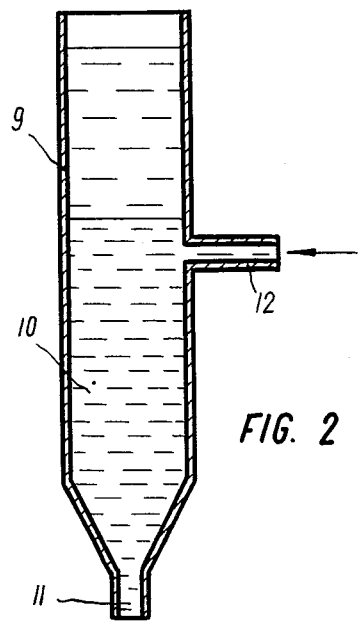

Sol formed from the thermoreversible gel of Example 4 was added dropwise at 135° C. into a vertical cylinder shown diagrammatically in FIG. 2. The vertical cylinder 9 was filled in its top part with 20° C. cool paraffin oil and in its bottom part with water of the same temperature. Falling through the oil layer the sol droplets solidified to spherical particles from which the solvent was washed out in the aqueous layer 10. Water was led out together with hydrogel beads through the outlet 11 to be separated, fresh water being supplied through the inlet tube 12 at such a rate that the boundary between the oil and water was kept at a constant level. Regular hydrogel beads thus obtained could be used e.g. as molecular sieves or as carriers for reactants. If a polymer or copolymer was used which did not swell in water, the spherical particles were deformed when passing the boundary between the two liquids.

EXAMPLE 9

Figure 3:
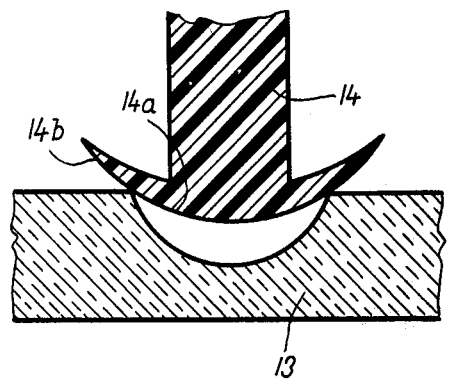

Sol formed from the thermoreversible gel prepared according to Example 4, showing, however, after coagulation and washing in water, swelling capacity of 75% in water at swelling equilibrium, due to the hydrolysis at 8° C. being shortened to 340 hours, was metered into a two-piece mold as shown in FIG. 3. The part 13 of the mold was made from glass, while the part 14 was made from polypropylene. The part 14 was rigid in its middle portion 14a, accurately curved, the tapering edge 14b being elastically deformable. The sol was metered in and the mold was closed and slowly cooled using a −15° C. bath of ethyl alcohol with dry ice. The two parts of the mold were pressed together by means of a spring. The cooled mold was dismantled and washed 5 minutes directly in the alcohol cooling bath and then in water at 20° C. A hydrogel contact lens was obtained.

EXAMPLE 10

Figure 4:
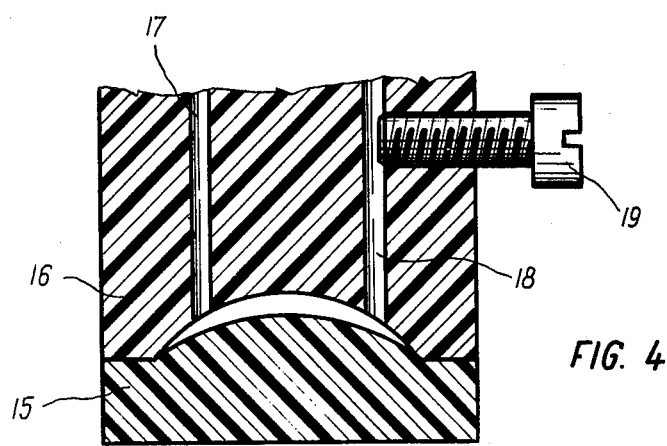

A two-piece mold from polytetrafluoroethylene as shown in FIG. 4 consisting of two parts 15, 16, was closed and a sol of a thermoreversible gel from Example 9 was metered under pressure through the inlet 17. The excess was pressed out through the overflow 18. After filling up the mold, the overflow outlet 18 was closed by means of the screw 19 and the mold was cooled by immersing it into an alcohol-dry ice bath at −50° C. During the cooling, the mold contents were steadily pressed in at a constant gauge-pressure of 1 atm. After cooling and opening the mold, the lens was washed in cool water. The soft contact lens was carefully finished by cutting off the overrunning parts, and stored in sterile physiologic saline solution.

What we claim is:
1. Method of manufacturing shaped water-insoluble hydrogel articles of the type comprising plates, filaments, hollow filaments, contact lenses, catheters, intubation tubes and dialysation membranes from crystalline acrylonitrile homopolymers and copolymers, consisting of the steps of:
   (1) Shaping a solution of a crystalline acrylonitrile homopolymer or copolymer in a mixture containing 50 to 99.5% by weight of a solvent and 0.5 to 50% by weight of a non-solvent, to the desired final shape;
   (2) Cooling the shaped solution to a temperature below the gelation point of the solution until the solution gelates without changing its composition and shape to form a shaped thermoreversible gel; and (3) Removing the solvent from the shaped thermoreversible gel by means of water at temperatures lower than the gelation point of the solution, whereby a shaped article having the shape established in step (1) is obtained.

2. Method according to claim 1, wherein said solvent is removed at a temperature which is at least 10° C. lower than the gelation temperature of the solution.

3. Method according to claim 1, wherein the crystalline acrylonitrile copolymer is a multi-block-copolymer of acrylonitrile and at least one monomer selected from the group consisting of acrylamide and acrylic acid, said multiblock-copolymer being obtained by controlled acid or alkaline homogeneous hydrolysis of polyacrylonitrile.

4. Method according to claim 1, where said solvent is removed from said shaped thermoreversible gel with a mixture of water and the solvent, the concentration of the solvent in said mixture being lower than in the thermoreversible gel.

* * * * *